No. 741,453. PATENTED OCT. 13, 1903.
W. M. BUTLER & C. E. WHITNEY.
DRIVE CHAIN.
APPLICATION FILED JAN. 14, 1903.
NO MODEL.
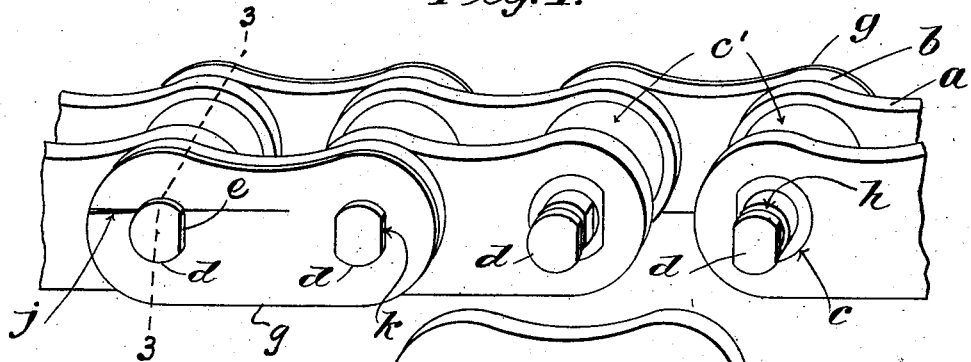
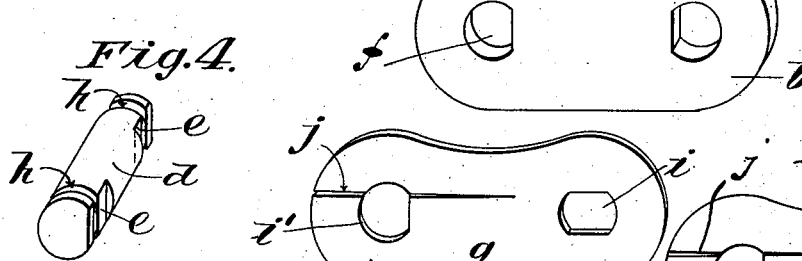
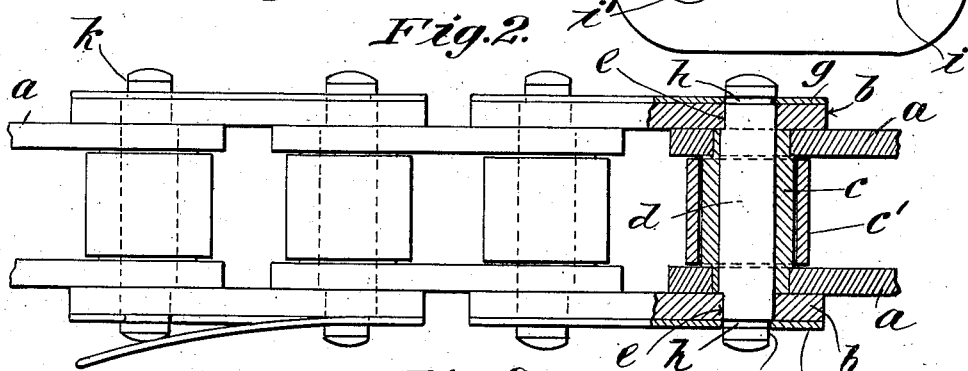
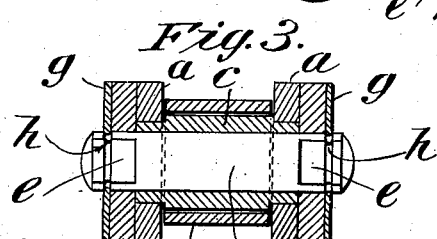
Witnesses:
Inventors:
William M. Butler
Clarence E. Whitney
by Chapin & Co
Attorneys No. 741,453. Patented October 13, 1903.

UNITED STATES PATENT OFFICE.

WILLIAM M. BUTLER AND CLARENCE E. WHITNEY, OF HARTFORD, CONNECTICUT; SAID BUTLER ASSIGNOR TO THE WHITNEY MANUFACTURING COMPANY, OF HARTFORD, CONNECTICUT, A CORPORATION.

DRIVE-CHAIN.

SPECIFICATION forming part of Letters Patent No. 741,453, dated October 13, 1903.

Application filed January 14, 1903. Serial No. 139,051. (No model.)

*To all whom it may concern:*

Be it known that we, WILLIAM M. BUTLER and CLARENCE E. WHITNEY, citizens of the United States of America, residing at Hartford, in the county of Hartford and State of Connecticut, have invented new and useful Improvements in Drive-Chains, of which the following is a specification.

This invention relates to the construction of drive-chains; and the object thereof is to produce a chain having detachably-connected links so constructed that the chain may be separated by the removal of two of the outside links thereof at any point in the chain without changing during the operation the relative position of the contiguous parts so separated; and to that end the invention consists in the construction of a chain whose contiguous links are united by a loose pin adapted to be locked against endwise and preferably, also, rotative movements by a locking means detachably engaging the ends of the pins outside of the outside links.

In the drawings forming part of this application, Figure 1 is a perspective view of a chain embodying our invention, showing portions of the chain removed. Fig. 2 is a top plan view of Fig. 1, partly in section. Fig. 3 is a sectional view on line 3 3, Fig. 1, the pin being in full lines. Fig. 4 is a perspective view of a pin which connects the links of the chain together. Fig. 5 is a side elevation of a locking-plate, showing a slightly-modified construction.

In the manufacture of drive-chains, especially those which are to be subjected to heavy strains, it is essential in many of the places where they are employed that it should be practically impossible to elongate them. Furthermore, it is very desirable also that it should be possible to disconnect the links of the chain without the use of special tools. Again, it is very desirable that the wearing-surfaces of the chain—viz., the pins and its bearings—should be hardened. This hardening would, however, preclude the heading or the upsetting of the ends of the pins to hold the links in position.

It is not broadly new to make a chain which is detachable or separable at any point and which is provided with pins to hold the links in their places without upsetting the ends thereof; but the manner in which such chains have been made heretofore, so far as we are aware, possesses a very great disadvantage in that a keyhole-slot for each pin is punched in the outer links or side plates of the chain, running lengthwise thereof, and the ends of the connecting-pins so fashioned as to permit their insertion at the larger end of said slot nearest the center of the link, from which point they can be moved toward their normal location at or near the ends of the plate. A good example of a chain of this character is illustrated and described in the United States Letters Patent issued to William H. Gates on December 18, 1900, and numbered 664,256. It has been found, however, that under heavy strains these side links will elongate. A further disadvantage of this type of chain lies in the fact that in order to separate the links at any point the chain must be grasped each side of the point where the separation is to be effected and the center blocks forced one toward the other in order to move the pins in said keyhole-slots toward the center of the outside links of the chain, where said slot is enlarged to permit the withdrawal of the plate. Furthermore, chains put together after the manner described in the Gates patent, above referred to, are quite liable to have a pitch which is not true, for the reason that the pin may not always be seated in the bottom of the slot in the side links in absolutely the same position. This proper location of the pin may be prevented by a bur in the slot or by an accumulation of dirt and oil; and, furthermore, it is not always convenient to provide in a chain in use the slack necessary to permit the two parts of the chain to be moved one toward the other to effect the separation thereof.

Referring now to the drawings, *a* may indicate the center block of the chain, which consists of two side plates conforming in outline to the plates *b*, which link the blocks together. These side plates, near each end thereof, are rigidly united by a tubular rivet *c*, on which are the rolls *c'*. These center blocks constitute no part of the invention;

but any center block (a number of which are adapted to be hinged together in the manner hereinafter described) may be substituted for those shown and described herein. Suffice it to say, further, that after the usual manner of making the "roller-chain," so called, the tubular rivets $c$ are preferably so mounted in the side plates of the center blocks as to be securely held against rotation. The tubular rivets each receive a pin $d$, which fits loosely in the center block, which may turn freely thereon, and each end of the pin extends far enough beyond the sides of the center block to receive the side plates $b$ by means of which the center blocks are linked together.

It is desirable that the pins $d$ shall be rigidly held against rotation in the side plates, and to that end each end of the pin is slabbed off on one side, as indicated by $e$ and which is clearly shown in Figs. 3 and 4. The hole $f$, which is punched through the side plates $b$, is made to conform to the cross-sectional area of the pin at the point where it is slabbed off. When two of the pins have been passed through the rivets of two adjoining center blocks and the two side plates $b$ slipped over the ends of these pins, the latter will project far enough beyond the sides of the plates $b$ to permit a locking-plate $g$ to be applied to the pins to prevent them from being withdrawn. This locking-plate is so constructed as to engage annular grooves $h$ in each end of the pins $d$, the inner edges of which, as shown in Fig. 3, are practically flush with the outer surface of these plates, the latter being so constructed that they may be easily removed by hand without requiring the use of special tools or without the manipulation of the chain—that is to say, without slackening it up and without forcing any two of the links together to effect their disengagement.

The preferred form of locking means for securing the pins and the side plates in their proper position is shown in the drawings, and it consists in a thin plate of some spring metal in outline conforming to the side plate to which it is applied and having two perforations $i$ $i'$, one in each end thereof, the plate being split longitudinally on the line $j$, which will intercept one of said slots. Preferably at a point opposite the portion $e$ thereof and extending from the annular groove $h$ outward the pin is also slabbed off at one end, as indicated at $k$, whereby two parallel sections are provided at the extreme end of the pin, producing an oblong terminal, and one of the perforations—namely, $i$—of the locking-plate conforms in outline to the pin at this point, but being located in a position at right angles thereto, whereby in order to fit the locking-plate over the oblong end of the pin said plate must first be turned at right angles to the side plates until it has been pushed down over the pin far enough to come opposite the groove $h$, when it may be rotated to a position parallel with said plate. This will bring the other perforation $i'$ over the end of the other pin, and this partial rotation will effect the engagement of the border of the perforation with the groove $h$. To effect the engagement of the other perforation with the other pin before the perforation in the plate registers therewith and before the slit $j$ quite reaches the center of the pin, the portion $m$ of the locking-plate is sprung down until it is in the plane of the groove $h$, that portion of the locking-plate on the other side of the slit $j$ being supported on the top of the pin. If now the plate $g$ be moved to a position of full registration with the side plates $b$, that part of the plate which rested on top of the pin will snap down onto the side plate as soon as the point of absolute registration of the perforation $i'$ and the pin is reached, and thus by the engagement of the borders of said perforation with the groove $h$ the pins will be restrained against endwise movement and the locking-plates be securely held against the side plates.

If desired, the locking-plate may be made as shown in Fig. 5, wherein both ends of the plate are provided with a slit $j$, the perforations in the locking-plate in this case still conforming in outline and in position to the ends of the pins, as shown in Fig. 1, for the reason that to apply this form of locking-plate it is only necessary to hold one end of the plate a little below the pin in which it was first applied in order to force the borders of the perforations on the part $m$ of the locking-plate into engagement with the grooves $h$ in one pin and then force that end of the plate into a position of registration with the side plate, whereupon the other end of the locking-plate may be similarly applied to the other pin. It is immaterial whether both of the slits $j$ be located as shown in Fig. 5, one at the upper edge of one perforation and the other at the lower edge of the second perforation of the plate, or whether they be in line one with another.

We do not wish it to be understood that we confine ourselves to the particular description of locking-plate shown and described herein, as the invention is broader than such a restriction would imply.

From the foregoing description of our invention it will be observed that it is only necessary to pry up that part of the locking-plate lying above the slit $j$ and to hold it raised above the end of the pin, whereupon by pushing upon that raised edge the plate may be disengaged from that pin and swung around upon the other pin until the perforation $i$ registers with the end of the latter, when the plate can be removed. The side plate from which the locking-plate has been removed may now be easily slipped over the ends of the pins and both pins pushed out of their bearings in the center blocks and the chain separated.

It is obviously immaterial whether the locking-plate be the exact counterpart of the side plate *b* in outline or not; but preferably it is so made.

Having thus described our invention, what we claim, and desire to secure by Letters Patent of the United States, is—

1. In a drive-chain, the combination with the center blocks, of side link-plates having pin-receiving holes of segmental form, pins passed loosely through the center blocks and having flattened end portions non-rotatably interlocked with said segmental holes and projecting through and beyond such holes, the projecting ends of the pins being grooved, and a removable spring locking-plate arranged at the outer side of each link-plate and having a detachable interlocked engagement with the grooved projecting terminals of both pins for said plate.

2. In a drive-chain, the combination with the center blocks, of side link-plates having pin-receiving holes, pins passed through the center blocks and having flattened end portions non-rotatably interlocked with the holes of the link-plates and projecting through and beyond such holes, the projecting ends of the pins being provided with locking elements, and a removable spring locking-plate arranged at the outer side of each link-plate and having an opening interlocked with and released from the projecting end of one pin through rotation of the locking-plate, the latter also having a perforated split end portion having a snapping engagement with the end of the other pin for the same link-plate.

3. In a drive-chain, the combination with the center blocks, of the side link-plates arranged to unite the blocks and having pin-receiving holes of segmental form, pins passed loosely through the center blocks and having flattened end portions non-rotatably interlocked with the segmental openings in the link-plates and projecting through and beyond such openings, the projecting ends of the pins being provided with annular locking-grooves and one end of each pin being additionally provided beyond the plane of the groove with an oblong head, and a removable spring locking-plate arranged at the outer side of each link-plate and having at one end an oblong hole adapted to be rotatably engaged and interlocked with the grooved oblong end of one pin for such plate, and also having a perforated split end portion having a snapping engagement with the end of the other pin for the plate and whose perforation corresponds in cross-sectional form to such end of the other pin.

WM. M. BUTLER.
CLARENCE E. WHITNEY.

Witnesses:
E. M. COUCH,
WM. H. CHAPIN.